(12) United States Patent
Vail et al.

(10) Patent No.: US 9,841,312 B2
(45) Date of Patent: Dec. 12, 2017

(54) SYSTEM AND METHOD FOR ESTIMATING QUANTITY OF PAYLOAD

(71) Applicant: Caterpillar Inc., Peoria, IL (US)

(72) Inventors: Robert S. Vail, Monticello, IL (US); Thomas N. Brooks, Jr., Oakley, IL (US)

(73) Assignee: Caterpillar Inc., Peoria, IL (US)

( * ) Notice: Subject to any disclaimer, the term of this patent is extended or adjusted under 35 U.S.C. 154(b) by 452 days.

(21) Appl. No.: 14/558,821

(22) Filed: Dec. 3, 2014

(65) Prior Publication Data

US 2016/0161323 A1 Jun. 9, 2016

(51) Int. Cl.
*G01G 19/04* (2006.01)
*G01G 19/08* (2006.01)

(52) U.S. Cl.
CPC .................. *G01G 19/083* (2013.01)

(58) Field of Classification Search
CPC .................................... G01G 19/083
USPC ........................................ 702/174
See application file for complete search history.

(56) References Cited

U.S. PATENT DOCUMENTS

| 4,921,578 | A | 5/1990 | Shiraishi et al. | |
| 5,105,896 | A | 4/1992 | Kyrtsos | |
| 6,829,943 | B2 | 12/2004 | Weyand et al. | |
| 2014/0237868 | A1* | 8/2014 | Whitchurch | E02F 3/651 37/413 |
| 2014/0320293 | A1* | 10/2014 | Hunter, Jr. | G01L 19/12 340/626 |

FOREIGN PATENT DOCUMENTS

EP 2275287 1/2011

* cited by examiner

*Primary Examiner* — Hoai V Ho

(57) ABSTRACT

A method for estimating a quantity of a payload within a bed of a wagon coupled to a machine is provided. The method includes raising the bed of the wagon to a predetermined height. The method includes receiving a pressure signal indicative of a pressure in a hoist cylinder coupled to the bed of the wagon. The method also includes receiving a load signal indicative of a load at a hitch of the wagon. The method further includes estimating the quantity of the payload in the bed of the wagon based, at least in part, on a predetermined relationship between the pressure signal and the load signal.

21 Claims, 3 Drawing Sheets

SYSTEM AND METHOD FOR ESTIMATING QUANTITY OF PAYLOAD

TECHNICAL FIELD

The present disclosure relates to a system and a method for estimating a quantity of a payload, and more specifically to a system and a method for estimating a quantity of a payload in a bed of a wagon.

BACKGROUND

Usually, a quantity of a payload present within a wagon coupled to a tractor is estimated by measuring change in pressure within suspension members of the wagon. For a wagon without suspension members, a similar method for estimating the quantity of the payload may not be applicable. In such a situation, the quantity of the payload within the wagon may be estimated by determining a load at a hitch of the tractor, at which the wagon is coupled to the tractor.

However, since the hitch is located at one end of the wagon, the load present at the hitch may not provide an accurate indication of the quantity of the payload present within the wagon. Hence, there is a need for an improved system and method for estimating the quantity of the payload, especially in such machines.

European Patent No. 2,275,287 describes a loading vehicle having a hitch drawbar attached to a tractor. The tractor is attached to a drawbar-fluid pressure cylinder for tilting and damping angular movement of the hitch drawbar. The vehicle includes a weight detection unit. The weight detection unit detects a weight and/or a loading condition of the vehicle. The weight detection unit includes a pressure gauge for measuring a fluid pressure in a chassis and the pressure cylinder. The weight detection unit then outputs corresponding pressure signals. The vehicle also includes an evaluation unit. The evaluation unit determines the weight and/or the loading condition of the vehicle based on the pressure signals.

SUMMARY OF THE DISCLOSURE

In one aspect of the present disclosure, a method for estimating a quantity of a payload within a bed of a wagon coupled to a machine is provided. The method includes raising the bed of the wagon to a predetermined height. The method includes receiving a pressure signal indicative of a pressure in a hoist cylinder coupled to the bed of the wagon. The method also includes receiving a load signal indicative of a load at a hitch of the wagon. The method further includes estimating the quantity of the payload in the bed of the wagon based, at least in part, on a predetermined relationship between the pressure signal and the load signal.

In another aspect of the present disclosure, a machine is provided. The machine includes a frame having a hitch. The machine includes a wagon coupled to the frame via the hitch. The wagon includes a bed. The machine also includes at least one pressure sensor coupled to a hoist cylinder of the wagon. The at least one pressure sensor is configured to generate a pressure signal indicative of a pressure in the hoist cylinder. The machine further includes a measurement module communicably coupled to the at least one pressure sensor. The measurement module is configured to receive the pressure signal from the at least one pressure sensor. The measurement module is also configured to receive a load signal indicative of a load at the hitch of the wagon. The measurement module further includes estimating a quantity of a payload in the bed of the wagon based, at least in part, on a predetermined relationship between the pressure signal and the load signal.

A system for a wagon coupled to a machine is provided. The system includes at least one pressure sensor coupled to a hoist cylinder of the wagon. The at least one pressure sensor is configured to generate a pressure signal indicative of a pressure in the hoist cylinder. The system also includes a measurement module communicably coupled to the at least one pressure sensor. The measurement module is configured to receive the pressure signal from the at least one pressure sensor. The measurement module is also configured to receive a load signal indicative of a load at a hitch of the wagon. The measurement module is further configured to estimate a quantity of a payload in a bed of the wagon based, at least in part, on a predetermined relationship between the pressure signal and the load signal.

Other features and aspects of this disclosure will be apparent from the following description and the accompanying drawings.

DETAILED DESCRIPTION

Figure 1:
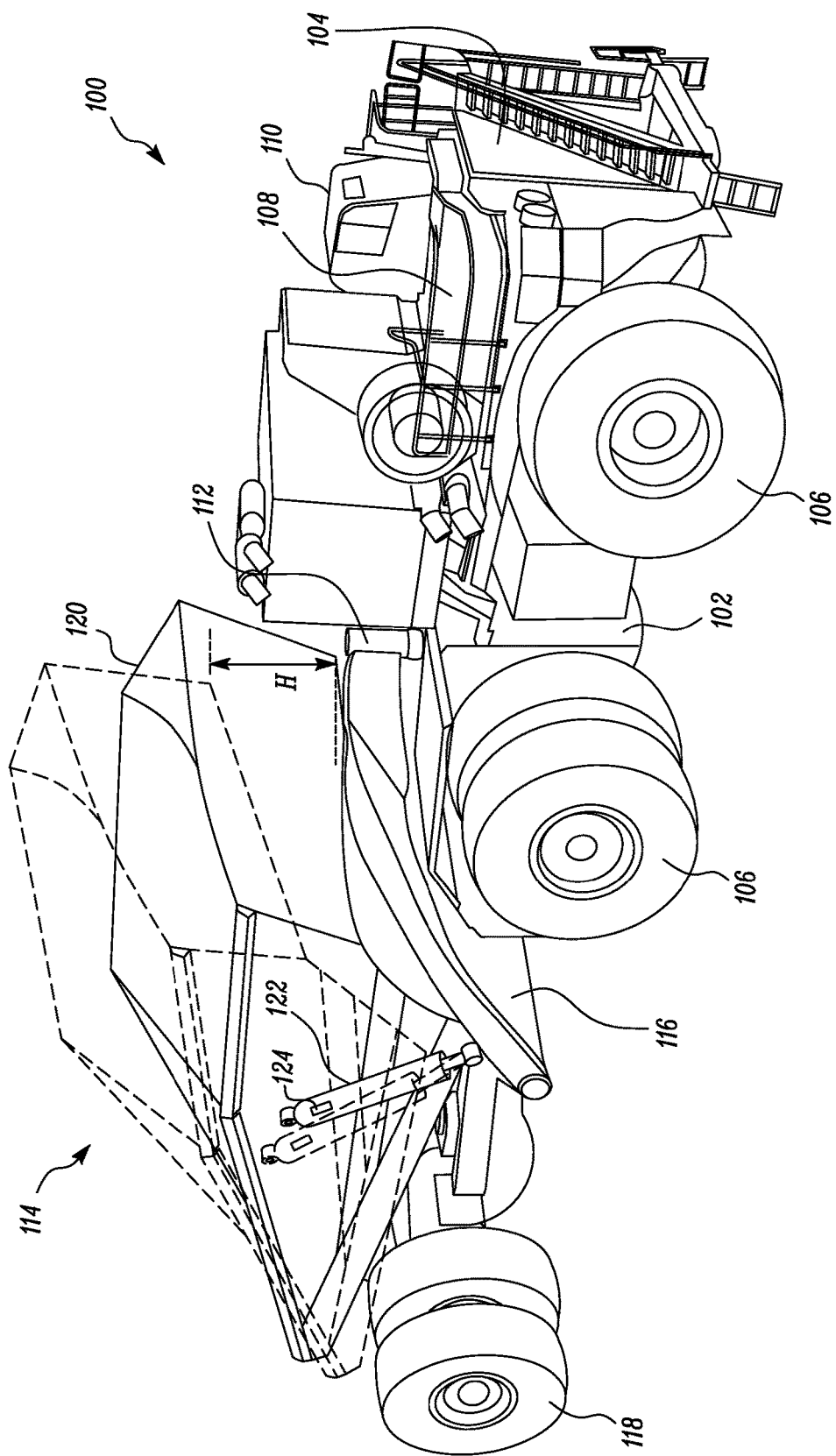
FIG. 1 is an exemplary machine, according to an embodiment of the present disclosure.

Wherever possible, the same reference numbers will be used throughout the drawings to refer to the same or similar parts. Referring to FIG. 1, an exemplary machine 100 is illustrated. More specifically, the machine 100 is an off-highway tractor. In other embodiments, the machine 100 may be associated with an industry, such as, construction, mining, forestry, agriculture, waste management, material handling, transportation, and so on. Accordingly, in other embodiments, the machine 100 may be a haul truck, a mining truck, and so on.

The machine 100 includes a frame 102. The frame 102 is configured to support and/or mount one or more components of the machine 100. The machine 100 includes an enclosure 104 provided on the frame 102. The enclosure 104 is configured to house an engine or any other power source such as batteries. The engine is configured to provide power to the machine 100 for operational and mobility requirements. The machine 100 includes one or more ground engaging members 106 such as, wheels. The ground engaging members 106 are configured to provide mobility to the machine 100 on ground.

The machine 100 includes a platform 108 provided on the frame 102. The platform 108 provides access to various locations on the machine 100 for operational and/or maintenance purpose. The machine 100 includes an operator cabin 110 provided on the frame 102. The operator cabin 110 may be accessed via the platform 108. The operator cabin 110 may include one or more control devices (not shown) such as, a joystick, a steering wheel, pedals, levers, buttons, switches, and so on. The control device is configured to enable the operator to control the machine 100 on the ground. The operator cabin 110 may also include an operator interface such as, a display device, a sound source, a light source, or a combination thereof. The operator interface may provide information to the operator related to various machine parameters.

The machine 100 includes a hitch 112 provided on the frame 102. The hitch 112 is configured to hingedly couple a wagon 114 to the frame 102 of the machine 100. In other embodiments, the hitch 112 may be configured to hingedly couple a trailer (not shown) to the frame 102 of the machine 100. The wagon 114 includes a chassis 116. The wagon 114 also includes a set of ground engaging members 118 such as, wheels rotatably coupled to the chassis 116. It should be noted that the ground engaging members 118 are directly coupled to the chassis 116, without the use of suspension members therebetween, that is, the wagon 114 is of an unsuspended type. Alternatively, the wagon 114 may be of a suspended type such that one or more suspension members may be provided between the ground engaging members 118 and the chassis 116.

The wagon 114 includes a bed 120 pivotably supported on the chassis 116. The bed 120 has a hollow configuration. The bed 120 is configured to receive a payload therein to be hauled from one location to another. The wagon 114 also includes at least one hoist cylinder 122. The hoist cylinder 122 is coupled to the chassis 116 at one end and to the bed 120 at the other end. The hoist cylinder 122 may be any pneumatic or hydraulic cylinder known in the art. The hoist cylinder 122 is configured to raise and lower the bed 120 based on an extension and a retraction of the hoist cylinder 122 respectively. The movement of the bed 120 based on the extension and the retraction of the hoist cylinder 122 is shown using ghost lines in the accompanying drawings.

More specifically, in the extended position, the hoist cylinder 122 is configured to raise the bed 120 during unloading of the payload from the bed 120. In the retracted position, the hoist cylinder 122 is configured to lower the bed 120 to receive the payload therein during loading or transportation of the payload. Additionally, the wagon 114 includes a pressure sensor 124 coupled to the hoist cylinder 122. The pressure sensor 124 is configured to generate a pressure signal indicative of a pressure in the hoist cylinder 122. More specifically, during raising of the bed 120, the extension of the hoist cylinder 122 results in a pressure change therein. This change in pressure is detected by the pressure sensor 124 and, thereby, generates the pressure signal and will be explained later in detail.

In some embodiments, the wagon 114 may include a plurality of hoist cylinders (not shown). For example, the plurality of hoist cylinders may include a first hoist cylinder and a second hoist cylinder. In other embodiments, the plurality of hoist cylinders may include more than two hoist cylinders. The first hoist cylinder and the second hoist cylinder may be positioned on either sides of the wagon 114. In some embodiments, the first and second hoist cylinders may be positioned on the same side of the wagon 114 or a combination of any sides of the wagon 114. In such a situation, the wagon 114 may also include a plurality of pressure sensors (not shown). For example, the plurality of pressure sensors may include a first pressure sensor and a second pressure sensor coupled to the first hoist cylinder and the second hoist cylinder respectively. The first and second pressure sensors may be configured to generate the pressure signal indicative of the pressure in the first and second hoist cylinders respectively.

Figure 2:
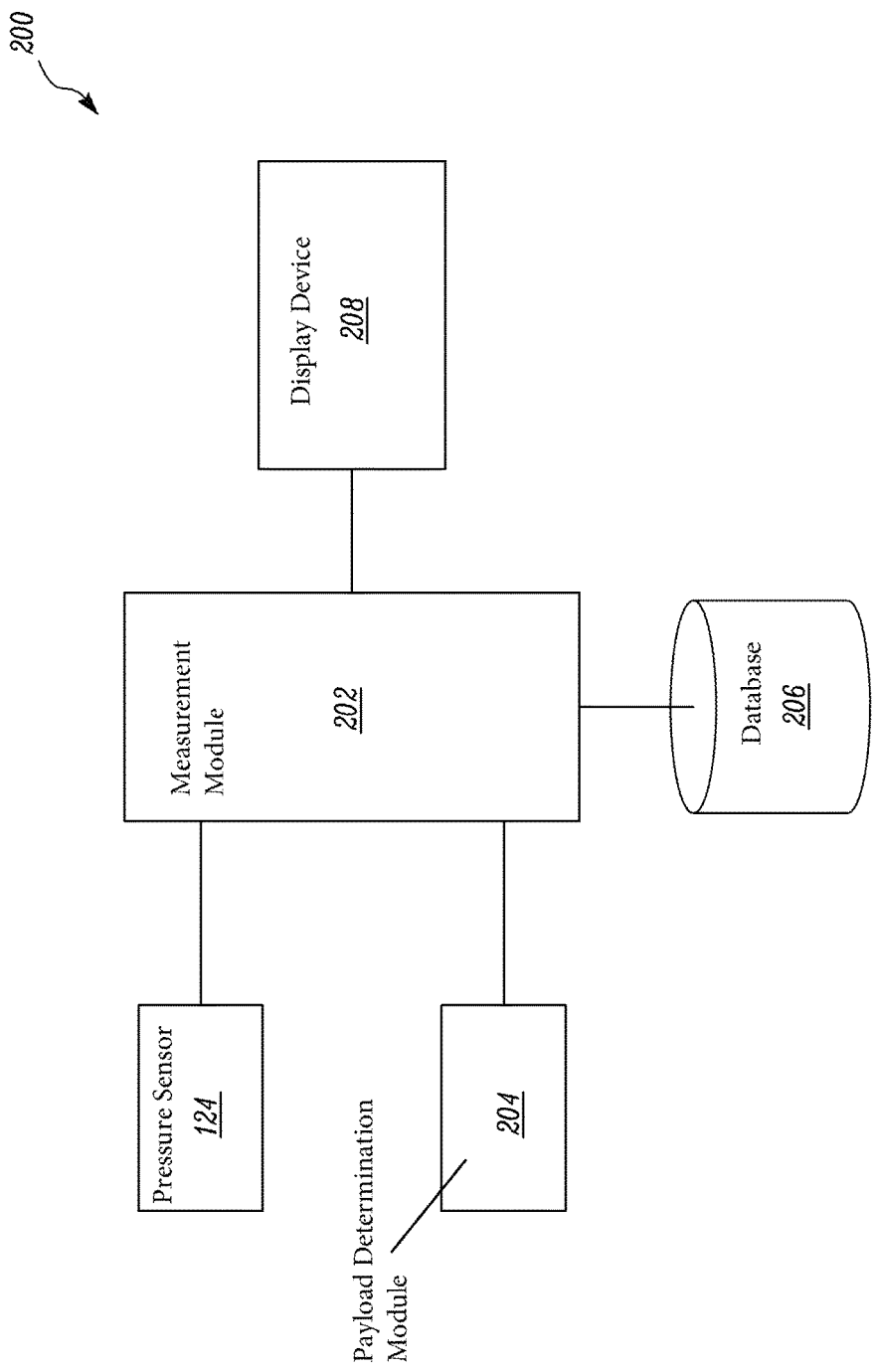
FIG. 2 is a block diagram of an exemplary payload estimation system of the machine, according to an embodiment of the present disclosure.

The present disclosure relates to a payload estimation system 200 in association with the machine 100. Referring to FIG. 2, a block diagram of the payload estimation system 200 is illustrated. The payload estimation system 200 includes a measurement module 202. The measurement module 202 may be provided on the wagon 114 or at any other location on the machine 100. In other embodiments, the measurement module 202 may be located at a remote control station.

The measurement module 202 is communicably coupled to the pressure sensor 124. In the embodiment, when the wagon 114 includes the plurality of pressure sensors, the measurement module 202 is communicably coupled to each of the plurality of pressure sensors. Initially, after the loading operation is completed, the bed 120 of the wagon 114 may be raised to a predetermined height "H", using the hoist cylinder 122.

The predetermined height "H" may be any distance above the chassis 116 of the wagon 114 such as, for example approximately 0.5 inch, 0.1 inch, 1.5 inch or any other suitable height. This action of the raising of the bed 120 may be performed by an actuator (not shown) coupled to the hoist cylinder 122. In some embodiments, the operator may activate the actuator to extend the hoist cylinder 122 via the control device. In other embodiments, the measurement module 202 may be configured to activate the actuator to extend the hoist cylinder 122. In such a situation, the measurement module 202 may be communicably coupled to the actuator or the hoist cylinder 122.

Further, after the raising of the bed 120 of the wagon 114, the measurement module 202 is configured to receive the pressure signal from the pressure sensor 124. A person of ordinary skill in the art will appreciate that the predetermined height "H" may be appropriately selected so as to raise the bed 120 above the chassis 116 and generate the pressure in the hoist cylinder 122 and the associated pressure signal by the pressure sensor 124. The values of the predetermined height "H" stated herein are exemplary and do not limit the scope of the present disclosure.

The measurement module 202 is also communicably coupled to a payload determination module 204. The payload determination module 204 may be an existing system on the machine 100, such as, for example, a Tractor Payload Measurement System (TPMS). The payload determination module 204 is configured to generate a load signal indicative of a load at the hitch 112 of the wagon 114. The payload determination module 204 may generate the load signal by any known method using a predetermined algorithm, a predetermined relationship, a predetermined equation, and so on. Accordingly, the measurement module 202 is configured to receive the load signal from the payload determination module 204. Further, it should be noted that, in some embodiments, the measurement module 202 may be integrated with the payload determination module 204. In such a situation, a controller (not shown) of the payload determination module 204 may be configured to perform functions of the measurement module 202.

Further, the measurement module 202 is configured to estimate a quantity of the payload in the bed 120 of the wagon 114 based, at least in part, on a predetermined relationship between the pressure signal and the load signal. In one embodiment, the measurement module 202 may compute the quantity of the payload in the bed 120 of the wagon 114 based on the predetermined relationship. The predetermined relationship may be a mathematical formula or relationship stored in a database 206 communicably coupled to the measurement module 202 or a memory (not shown) of the measurement module 202. Accordingly, the measurement module 202 may retrieve the predetermined relationship from the database 206 or the memory of the measurement module 202. Further, the measurement module 202 may calculate the estimated quantity of the payload based on the predetermined relationship.

In other embodiments, the measurement module 202 may be configured to estimate the quantity of the payload in the bed 120 of the wagon 114 by comparing the pressure signal and the load signal with a pre-calibrated dataset. The pre-calibrated dataset may be stored in the database 206 or the memory of the controller. In one embodiment, the pre-calibrated dataset may include a lookup table. In other embodiments, the pre-calibrated dataset may include a reference map.

The lookup table and/or the reference map may include predetermined readings of the quantity of the payload corresponding to different values of the pressure signal and the load signal. In yet other embodiments, the predetermined relationship between the pressure signal and the load signal may be a predetermined mathematical equation, relation, model or known algorithm for estimating the quantity of the payload. For example, a multiple polynomial regression model, a physics based model, a neural network model, any other model or algorithm, or a combination thereof known in the art.

Additionally, the payload estimation system 200 includes a display device 208 communicably coupled to the measurement module 202. The display device 208 may be provided in the operator cabin 110. Alternatively, the display device 208 may be provided away from the machine 100 at the remote control station. The display device 208 may be any display unit known in the art such as an LCD unit, an LED display unit, a CRT display unit, a segmented display unit, and so on.

The display device 208 is configured to display the estimated quantity of the payload to the operator. The estimated quantity of the payload may be displayed in any format such as alphabetical, numerical, alphanumerical, symbolic, and so on. In some embodiments, the display unit may include an audio unit (not shown) integrated therewith or as a separate unit. The audio unit may be configured to provide the estimated quantity of the payload to the operator using speech, warning signals, beeps, and so on.

The measurement module 202 may embody a single microprocessor or multiple microprocessors that includes a means for receiving signals from the pressure sensor 124 and the payload determination module 204. Numerous commercially available microprocessors may be configured to perform the functions of the measurement module 202. It should be appreciated that the measurement module 202 may readily embody a general machine microprocessor capable of controlling numerous machine functions. A person of ordinary skill in the art will appreciate that the measurement module 202 may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

Figure 3:
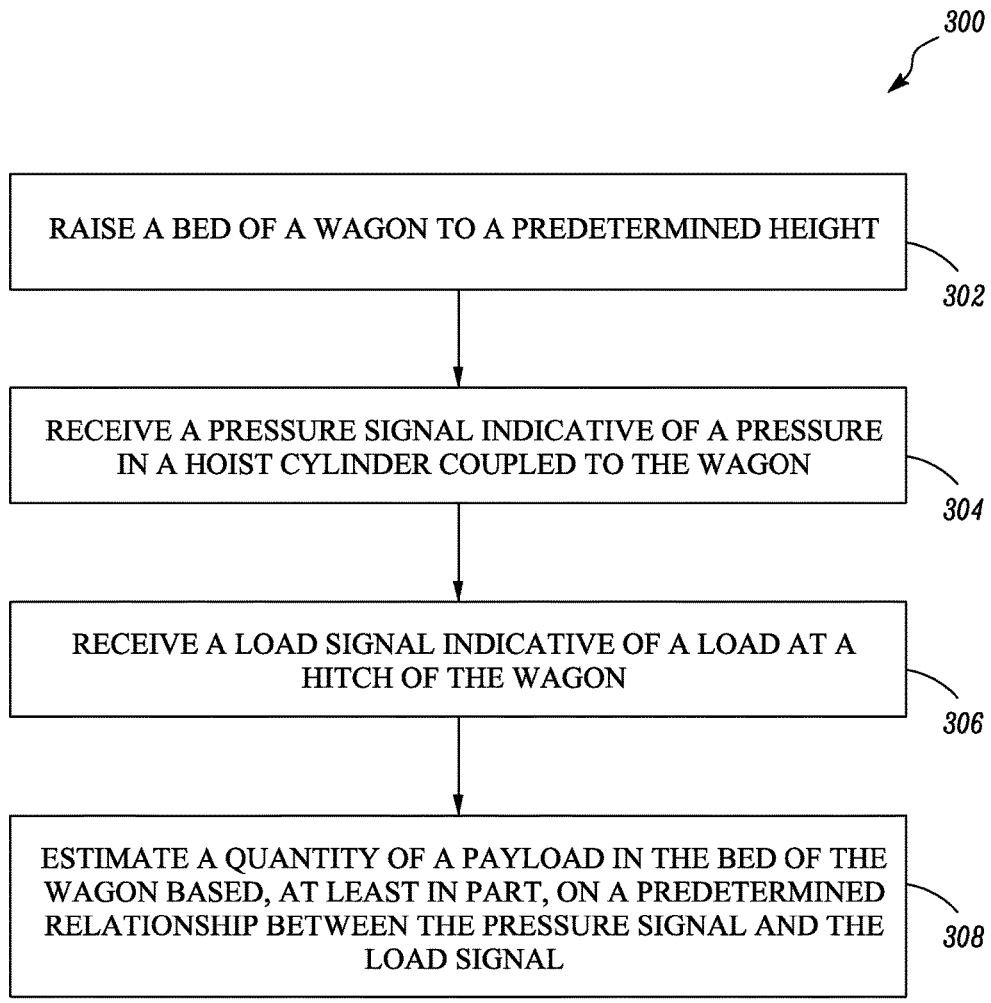
FIG. 3 is a flowchart of an exemplary method of working of the payload estimation system.

The present disclosure relates to a method 300 for estimating the quantity of the payload within the bed 120 of the wagon 114. Referring to FIG. 3, a flowchart of the method 300 is illustrated. At step 302, the bed 120 of the wagon 114 is raised to the predetermined height "H" above the chassis 116 of the wagon 114. More specifically, the hoist cylinder 122 is activated and extended to raise the bed 120 of the wagon 114 to the predetermined height "H" above the chassis 116.

At step 304, the measurement module 202 receives the pressure signal indicative of the pressure in the hoist cylinder 122 coupled to the bed 120 of the wagon 114. The pressure signal is generated by the pressure sensor 124 coupled to the hoist cylinder 122 after the bed 120 is raised to the predetermined height "H". At step 306, the measurement module 202 receives the load signal indicative of the load at the hitch 112 of the wagon 114. The load signal is generated by the payload determination module 204 communicably coupled to the measurement module 202.

At step 308, the measurement module 202 estimates the quantity of the payload in the bed 120 of the wagon 114 based, at least in part, on the predetermined relationship between the pressure signal and the load signal. In one embodiment, the measurement module 202 computes the quantity of the payload in the bed 120 of the wagon 114 based on the predetermined relationship. In other embodiments, the measurement module 202 estimates the quantity of the payload in the bed 120 of the wagon 114 by comparing the pressure signal and the load signal with the pre-calibrated dataset. Further, the measurement module 202 displays the estimated quantity of the payload on the display device 208. Additionally or optionally, in some embodiments, the estimated quantity of the payload may be provided to the operator using the audio unit.

The payload estimation system 200 is configured to estimate the quantity of the payload within the bed 120 of the wagon 114 by using two parameters, viz. the pressure signal in the hoist cylinder 122 and the load signal at the hitch 112. As a result, the quantity of the payload within the bed 120 of the wagon 114 of the unsuspended type may be accurately estimated.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for estimating a quantity of a payload in a bed of a wagon coupled to a machine, the method comprising:
   raising the bed of the wagon to a predetermined height;
   receiving a pressure signal indicative of a pressure in a hoist cylinder coupled to the wagon in response to the bed of the wagon being raised to the predetermined height, the hoist cylinder being directly coupled to the wagon of the machine wherein a first end of the hoist cylinder is attached to a chassis of the machine and a second end of the hoist cylinder is attached to the bed of the wagon;
   receiving a load signal indicative of a load at a hitch of the wagon; and
   estimating the quantity of the payload in the bed of the wagon based, at least in part, on a predetermined relationship between the pressure signal and the load signal.

2. The method of claim 1, wherein the estimating step further includes:
   computing the quantity of the payload in the bed of the wagon based on the predetermined relationship.

3. The method of claim 1, wherein the estimating step further includes:
comparing the pressure signal and the load signal with a pre-calibrated dataset.

4. The method of claim 1, wherein the raising step further includes:
activating the hoist cylinder to raise the bed of the wagon to the predetermined height.

5. The method of claim 1 further comprising:
displaying the estimated quantity of the payload on a display device.

6. A machine comprising:
a frame having a hitch;
a wagon coupled to the frame via the hitch, the wagon having a bed, wherein the bed is configured to be adjusted in height via a hoist cylinder;
at least one pressure sensor coupled to the hoist cylinder of the wagon, the at least one pressure sensor configured to generate a pressure signal indicative of a pressure in the hoist cylinder, the hoist cylinder being directly coupled to the wagon of the machine wherein a first end of the hoist cylinder is attached to a chassis of the machine and a second end of the hoist cylinder is attached to the bed of the wagon; and
a measurement module communicably coupled to the at least one pressure sensor, the measurement module configured to:
receive the pressure signal from the at least one pressure sensor in response to the bed of the wagon being raised to a predetermined height via the hoist cylinder;
receive a load signal indicative of a load at the hitch of the wagon; and
estimating a quantity of a payload in the bed of the wagon based, at least in part, on a predetermined relationship between the pressure signal and the load signal.

7. The machine of claim 6, wherein the measurement module is configured to:
compute the quantity of the payload in the bed of the wagon based on the predetermined relationship.

8. The machine of claim 6, wherein the measurement module is configured to:
compare the pressure signal and the load signal with a pre-calibrated dataset.

9. The machine of claim 6, wherein the at least one pressure sensor further includes:
a first pressure sensor coupled to a first hoist cylinder; and
a second pressure sensor coupled to a second hoist cylinder, wherein the first hoist cylinder and the second hoist cylinder are positioned on either sides of the wagon.

10. The machine of claim 6, wherein the hoist cylinder is configured to:
raise the bed of the wagon to a predetermined height for receiving the pressure signal.

11. The machine of claim 6 further comprising:
a payload determination module communicably coupled to the measurement module, the payload determination module configured to generate the load signal.

12. The machine of claim 6 further comprising:
a display device communicably coupled to the measurement module, the display device configured to display the estimated quantity of the payload.

13. The machine of claim 6, wherein the wagon is of an unsuspended type.

14. A system for a wagon coupled to a machine, the system comprising:
at least one pressure sensor coupled to a hoist cylinder of the wagon wherein the hoist cylinder is configured to adjust a height of a bed of the wagon, the at least one pressure sensor configured to generate a pressure signal indicative of a pressure in the hoist cylinder, the hoist cylinder being directly coupled to the wagon of the machine wherein a first end of the hoist cylinder is attached to a chassis of the machine and a second end of the hoist cylinder is attached to the bed of the wagon; and
a measurement module communicably coupled to the at least one pressure sensor, the measurement module configured to:
receive the pressure signal from the at least one pressure sensor in response to the bed of the wagon being raised to a predetermined height via the hoist cylinder;
receive a load signal indicative of a load at a hitch of the wagon; and
estimate a quantity of a payload in a bed of the wagon based, at least in part, on a predetermined relationship between the pressure signal and the load signal.

15. The system of claim 14, wherein the measurement module is configured to:
compute the quantity of the payload in the bed of the wagon based on the predetermined relationship.

16. The system of claim 14, wherein the measurement module is configured to:
compare the pressure signal and the load signal with a pre-calibrated dataset.

17. The system of claim 14, wherein the at least one pressure sensor further includes:
a first pressure sensor coupled to a first hoist cylinder; and
a second pressure sensor coupled to a second hoist cylinder, wherein the first hoist cylinder and the second hoist cylinder are positioned on either sides of the wagon.

18. The system of claim 14, wherein the hoist cylinder is configured to:
raise the bed of the wagon to a predetermined height for receiving the pressure signal.

19. The system of claim 14 further comprising:
a payload determination module communicably coupled to the measurement module, the payload determination module configured to generate the load signal.

20. The system of claim 14 further comprising:
a display device communicably coupled to the measurement module, the display device configured to display the estimated quantity of the payload.

21. The method of claim 1, wherein the first end of the hoist cylinder is hingedly attached to the chassis.

* * * * *